(12) United States Patent
Tecco et al.

(10) Patent No.: US 7,848,834 B2
(45) Date of Patent: Dec. 7, 2010

(54) COMPUTERIZED SYSTEM FOR NETWORK-BASED MANAGEMENT OF ENGINEERING PROJECTS

(75) Inventors: Thomas C. Tecco, Saline, MI (US); Kong Ping Oh, Troy, MI (US); Osman E. Atesoglu, Rochester Hills, MI (US); William E. Bejcek, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1312 days.

(21) Appl. No.: 10/402,270

(22) Filed: Mar. 28, 2003

(65) Prior Publication Data

US 2004/0193679 A1 Sep. 30, 2004

(51) Int. Cl.
*G06F 19/00* (2006.01)
(52) U.S. Cl. .......................... 700/97; 719/320
(58) Field of Classification Search ............... 700/9, 700/97, 182; 709/203, 219, 205, 221, 223; 707/4, 103 R, 9, 10, 100, 102, 103 Y, 103 X, 707/103 Z, 104.1; 718/100, 103, 107; 719/310–321, 719/328, 331, 332; 705/51; 715/748, 749; 717/165, 176, 177
See application file for complete search history.

(56) References Cited

U.S. PATENT DOCUMENTS

| | | | | |
|---|---|---|---|---|
| 5,889,520 | A * | 3/1999 | Glaser ..................... | 715/853 |
| 5,950,201 | A * | 9/1999 | Van Huben et al. ........... | 707/10 |
| 6,014,647 | A * | 1/2000 | Nizzari et al. .................. | 705/39 |
| 6,220,743 | B1 * | 4/2001 | Campestre et al. ............ | 700/97 |
| 6,397,117 | B1 * | 5/2002 | Burrows et al. ............... | 700/97 |
| 6,502,102 | B1 * | 12/2002 | Haswell et al. ............. | 707/102 |
| 6,757,576 | B2 * | 6/2004 | Greer et al. ................... | 700/97 |
| 6,907,546 | B1 * | 6/2005 | Haswell et al. ............... | 714/38 |
| 7,013,461 | B2 * | 3/2006 | Hellerstein et al. .......... | 717/177 |
| 7,020,697 | B1 * | 3/2006 | Goodman et al. ........... | 709/223 |
| 7,047,180 | B1 * | 5/2006 | Mathews et al. .............. | 703/27 |
| 7,143,025 | B2 * | 11/2006 | Walsh et al. .................. | 703/21 |
| 7,149,959 | B1 * | 12/2006 | Jones et al. .............. | 715/500.1 |

(Continued)

OTHER PUBLICATIONS

Reiter et al., Interaction between Java and LonWorks, IEEE, 1997.*

(Continued)

*Primary Examiner*—Paul L Rodriguez
*Assistant Examiner*—Carlos Ortiz Rodriguez
(74) *Attorney, Agent, or Firm*—Anthony L. Simon; Reising Ethington P.C.

(57) ABSTRACT

A computer system used for carrying out engineering tasks as a part of an engineering project. The system includes a plurality of client computers and one or more server computers accessible by the client computers via a communications network. Distributed across these computers is a multi-tiered software system that includes system programs, application programs, and database programs. The system programs include a system objects module, a job manager module, an event manager module, and a workbook module. The system objects module provides security and authentication services. The application programs carry out at least some of the engineering tasks. The job manager module manages use of the application programs. The event manager module receives and distributes notifications between at least some of the modules. The workbook module provides a user of the application programs with engineering information related to one or more of the engineering tasks.

15 Claims, 5 Drawing Sheets

U.S. PATENT DOCUMENTS

| | | | | |
|---|---|---|---|---|
| 7,236,976 | B2* | 6/2007 | Breitenbach et al. | 707/100 |
| 2001/0029550 | A1* | 10/2001 | Endo et al. | 709/319 |
| 2002/0007348 | A1* | 1/2002 | Ali et al. | 705/51 |
| 2002/0035408 | A1* | 3/2002 | Smith | 700/97 |
| 2002/0049788 | A1* | 4/2002 | Lipkin et al. | 707/513 |
| 2002/0052862 | A1* | 5/2002 | Scott et al. | 707/1 |
| 2002/0099460 | A1* | 7/2002 | Bowler et al. | 700/97 |
| 2002/0103557 | A1* | 8/2002 | Land | 700/96 |
| 2002/0109715 | A1* | 8/2002 | Janson | 345/744 |
| 2002/0173867 | A1* | 11/2002 | Duncan et al. | 700/97 |
| 2003/0074360 | A1* | 4/2003 | Chen et al. | 707/100 |
| 2003/0128239 | A1* | 7/2003 | Angal et al. | 345/762 |
| 2003/0140043 | A1* | 7/2003 | Hotchkiss et al. | 707/10 |
| 2003/0158919 | A1* | 8/2003 | Fomenko | 709/220 |
| 2003/0172020 | A1* | 9/2003 | Davies et al. | 705/36 |
| 2003/0172368 | A1* | 9/2003 | Alumbaugh et al. | 717/106 |
| 2003/0182370 | A1* | 9/2003 | Alasaarela | 709/204 |
| 2003/0187993 | A1* | 10/2003 | Ribot | 709/227 |
| 2003/0204517 | A1* | 10/2003 | Skinner et al. | 707/100 |
| 2003/0208505 | A1* | 11/2003 | Mullins et al. | 707/102 |
| 2003/0217170 | A1* | 11/2003 | Nelson et al. | 709/231 |
| 2004/0054675 | A1* | 3/2004 | Li | 707/100 |
| 2004/0068342 | A1* | 4/2004 | Bedont et al. | 700/182 |
| 2004/0098731 | A1* | 5/2004 | Demsey et al. | 719/328 |

OTHER PUBLICATIONS

Jones et al., Web-based Messaging Management Using Java Servlets, IEEE, 1999.*

Huang et al., A WWW-Based Virtual Instrument Software for Electric Power Measurements with Java Enhancement, IEEE, 2002.*

Coustan et al., How Operating Systems Work, howstuffworks.com.*

* cited by examiner

COMPUTERIZED SYSTEM FOR NETWORK-BASED MANAGEMENT OF ENGINEERING PROJECTS

TECHNICAL FIELD

The present invention relates to computer aided engineering (CAE) and engineering project and process management.

BACKGROUND OF THE INVENTION

CAE tools have been used for many years in the design, simulation, and test of mechanical and electrical systems. These tools include such things as design, simulation, analysis, modeling, test, and manufacturing computer software. In the automotive industry, for example, a mechanical system for a vehicle may utilize computer aided design (CAD) software for the design of individual components and assemblies within the system; vehicle synthesis, analysis, and simulation (VSAS) software for use by system analysts in modeling and analyzing the system and its components; computer aided test (CAT) software for conducting specific performance tests of the design; and computer aided manufacturing (CAM) software for aiding in the manufacturing of individual components. These programs are typically third party software packages that may not contain any standardization between them in terms of data formats and input/output protocols.

Today when an analysis engineer simulates or optimizes the performance of a system on the computer, the analyst typically needs to perform a variety of tasks, including: determining system performance requirements, such as a structure's fatigue life or a vehicle's fuel economy; determining design parameters, such as a beam's cross-sectional properties or vehicle mass; obtaining or creating a model of the system relating the performance requirements to the design parameters; obtaining data for creating or instantiating the model and for performing the simulation or optimization. The analyst will also typically need to know: the sequence of tasks needed for the simulation or optimization; how to view or process the simulation or optimization results; and how to archive the model and data for future references.

Adding to the complexity of the analyst's tasks is the fact that performance requirements and design parameters are often not readily available in organized electronic format and may be related to design parameters by models of different complexities, e.g., lumped-parameter and finite volume models for a vehicle underhood compartment. Many formats may exist for the same model depending upon the choice of simulation or optimization software, and the sequence of tasks needed for the simulation or optimization are often not documented, leading to ineffective and/or inconsistent simulation or optimization results. Furthermore, access to computer resources such as processors and printers may be limited or not apparent to the analyst, and this can be particularly true in larger organizations where these resources are distributed over multiple locations.

Efforts to simplify the analyst's tasks have included the definition of Standard Work, i.e., defining a set of corporate common processes and tools required to perform the steps given above, and agreeing on a minimum set of application software commonly referred to as the Common System. The Common System typically has a fixed architecture, i.e., output from one software application is fed into another through translator software. The commands, or run scripts, needed to execute the software are custom coded. Thus, for this type of Common System architecture, the software components often can only be replaced at great cost and inconvenience to the user community. Replacing one software application with another having the same or similar basic function can take years and millions of dollars.

It is therefore a general object of this invention to provide a computerized system for network-based management of engineering projects that integrates together various computerized engineering resources.

SUMMARY OF THE INVENTION

The invention provides a computer system for carrying out engineering tasks as a part of an engineering project. The system includes hardware in the form of a plurality of client computers and one or more server computers accessible by the client computers via a communications network. Distributed across these computers is a multi-tiered software system that includes system programs, application programs, and database programs. The system programs include a system objects module, a job manager module, an event manager module, and a workbook module. The system objects module is operable to provide security and authentication services. The application programs are operable to carry out at least some of the engineering tasks. The job manager module is operable to manage use of the application programs. The event manager module is operable to receive and distribute notifications between at least some of the modules. And the workbook module is operable to provide a user of the application programs with engineering information related to one or more of the engineering tasks.

Preferably, the programs are accessible as objects having predefined input and output protocols, and the computer systems include the following additional features. The system programs can include a job control module that interfaces to the job manager module and the application programs, with the job control module being operable to control execution of individual engineering tasks using the application programs. The system programs can also include a workflow module operable to provide a display depicting an ordered sequence of engineering tasks involved in the engineering project. The engineering information generated at various stages of the sequence of engineering tasks can be made available to the user via the workbook module. At least some of the application programs can be computer aided software tools used to carry out engineering tasks using data accessed via the database program. The application programs can include a business activities module that is operable to provide resource-planning information, and can also include a virtual review module operable to generate presentations and screen displays of status information concerning the engineering project.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
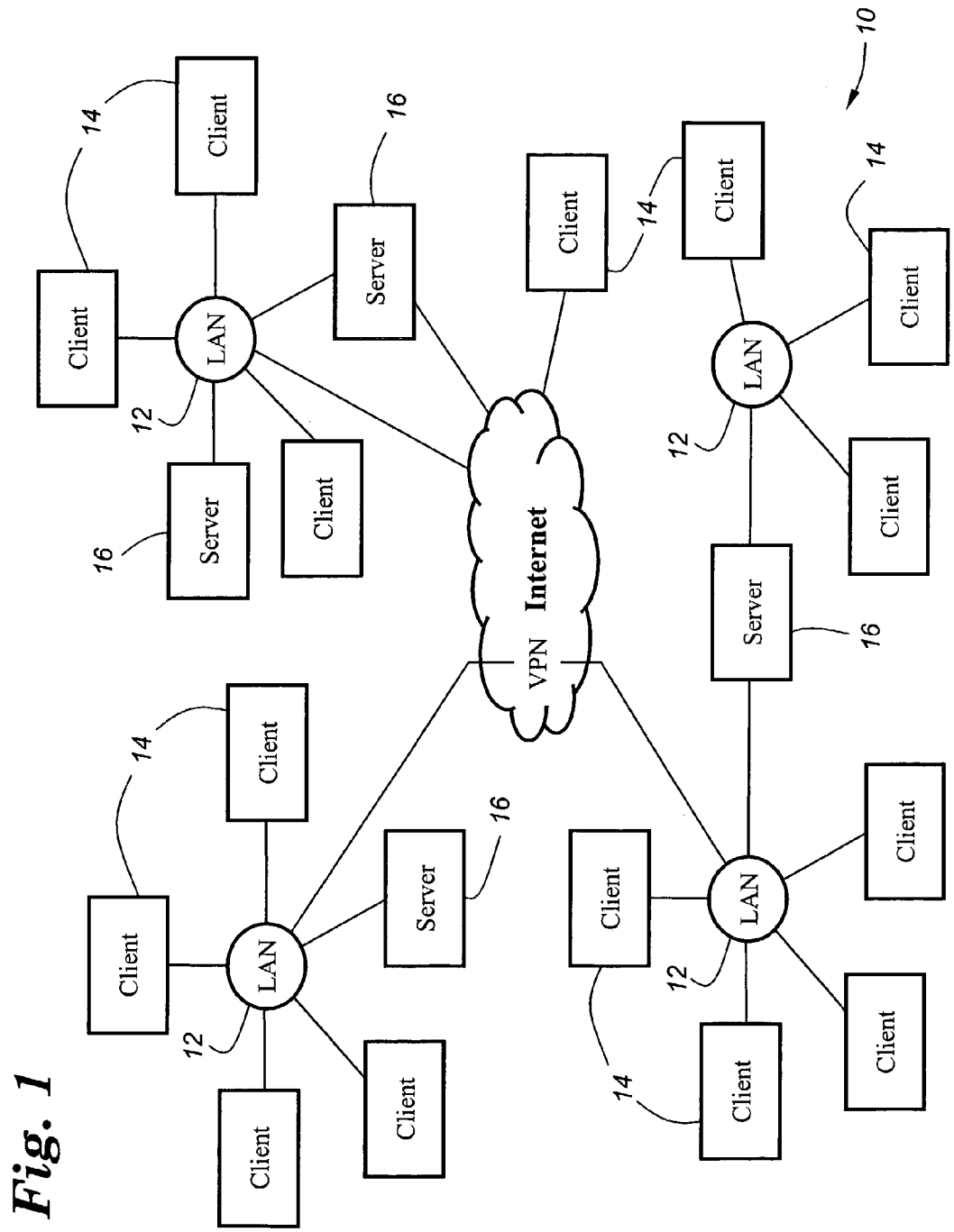
FIG. 1 is a block diagram of a preferred embodiment of a computer system of the present invention.

FIG. 1 depicts a hardware view of a distributed computer system 10 connected at various points to a global public network such as the Internet. As used herein, "computer system" refers to a combination of microprocessor-based computers that can communicate with each other via a communication network, along with one or more programs that are executable by at least one of the computers. Any suitable communications network can be used, the example in FIG. 1 including a number of LANs 12 communicating via TCP/IP. The computer system 10 is structured using a client/server approach in which user workstations are implemented as client computers 14 serviced by one or more server computers (servers) 16. For an enterprise, the computer system 10 may include a number of LANs 12 distributed among different facilities located in geographically diverse places. The communication network can, but need not, include dedicated connections between the different LANs 12 over, for example, the public telephone system, or can utilize a VPN through the Internet. Alternatively, the communications network can be one or more LANs connected wholly behind a company's firewall. Such network topologies are now widely used and no further explanation of the design or use of the hardware aspects of computer system 10 is therefore necessary.

Figure 2:
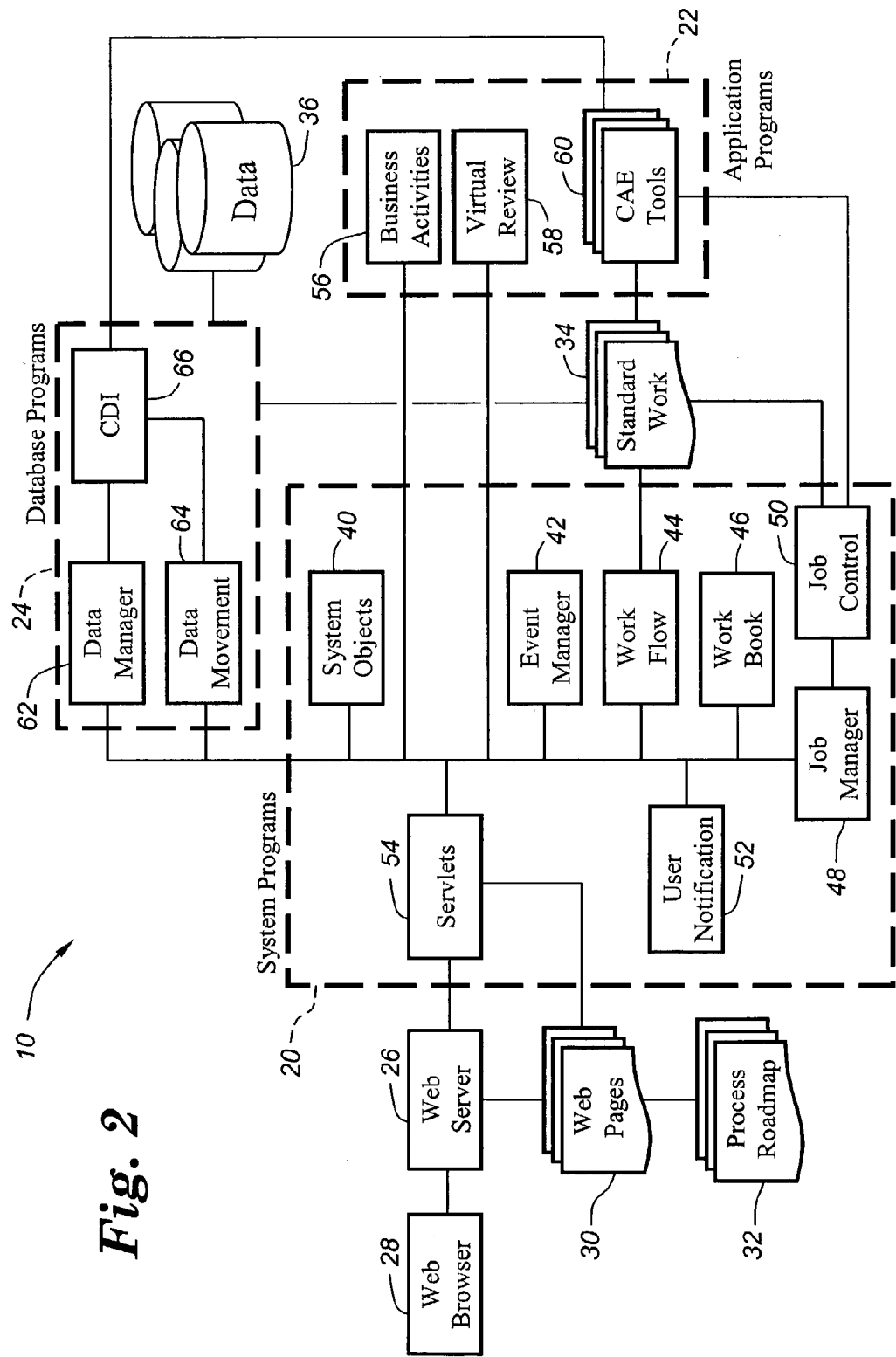
FIG. 2 is block diagram depicting the software used in the computer system of FIG. 1.

Referring now to FIG. 2, computer system 10 includes a multi-tiered software system that is distributed over two or more of the computers. Before describing the software aspects computer system 10 in detail, several additional points and definitions are worth noting. As used herein, a "program" or "computer program" means one or more related program modules, and a "program module" means one or more sets of instructions stored in computer-readable format, whether as object code or source code, and whether written in a compiled language, in byte code (such as Java™), or in a scripting or other interpreted language. Some of the programs may be resident on the client computers 14 (e.g., a web browser, solver program), whereas others will be stored and executed on one or more servers 16. As will be known to those skilled in the art, the division of the various programs discussed herein between the client and server computers can be selected as desired for a particular application.

The software system shown in FIG. 2 can be grouped into three primary collections of programs—system programs 20, application programs 22, and database programs 24. These three groups account for most of the main software components used by the system. There will of course be other programs, libraries, and associated files utilized by computer system 10 to carry out various known processes, one example being that utilized by a web server 26 to respond to user requests and deliver web content to a web browser 28 running on one of the client computers 14. The remaining blocks shown in FIG. 2 represent information in one form or another, including pre-defined static web pages 30, process roadmap definitions 32, standard work 34, and other data 36 including, in particular, CAE data. The system programs 20 include a systems objects module 40, an event manager module 42, a workflow module 44, and project work book module 46, a job manager module 48, a job control module 50, a user notification module 52, and servlets 54 that interface between the web server 26 and the other system programs 20. The application programs 22 include a business activities module 56, a virtual review module 58, and a number of CAE tools 60 including such things as pre-processors, solvers, post-processors, and reporting programs. The database programs include a data manager module 62 and a data movement module 64, both of which can be part of an overall Common Database Infrastructure (CDI) 66 used to handle management of, and access to, the data 36.

Both the data and the various program modules can be utilized within the computer system 10 as objects (such as objects within an object-oriented programming language) with pre-defined inputs, outputs, data elements, and functionalities. This helps minimize interfacing issues between different applications, both in terms of passing data between applications and providing additional add-on or plug-in functionality to applications. Data conversion and translation are examples of additional functionality. To implement the object-oriented approach, the system, application, and database programs can be encapsulated in object wrappers with a standardized protocol such as XML being used for communication between the programs. The use of object wrappers to encapsulate various programs and the use of XML for passing information between programs is well known to those skilled in the art.

Figure 3:
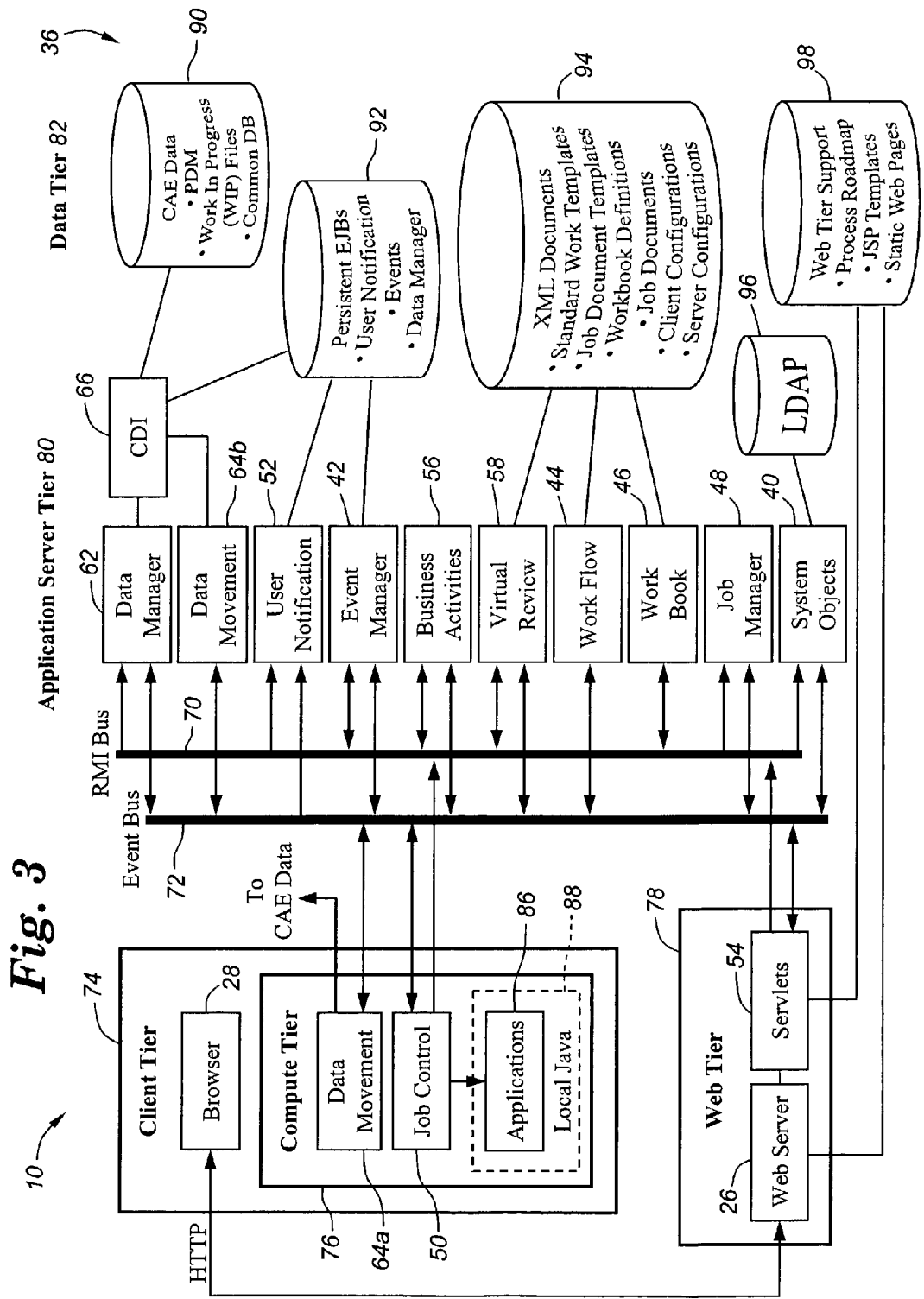
FIG. 3 is a block diagram depicting the programs of FIG. 2 organized into various tiers of software and showing the communication paths between the various components.

Before discussing the individual modules in detail, reference is made to FIG. 3, which depicts the organization of these modules into a multi-tiered architectural structure along with a communication bus 70 used to support communication to and from the various modules in the manner shown. This inter-module communication can be implemented using any number of protocols including: Java™ remote method invocation (RMI), an event bus 72 implemented over an RMI bus using JMS, http, CORBA, .Net, etc. In the illustrated embodiment, a five-tiered structure is used that includes a client tier 74, a compute tier 76, a web tier 78, an application server tier 80, and a data tier 82. At the upper level of the multi-tiered architecture is the client tier that includes both the compute tier programs and a web browser interface 28 that can be used for http-based access to both the application server tier programs 80 and compute tier applications 86. The compute tier 76 includes not only the various applications 86 needed by the user (which include, in particular, the CAE tools 60), but also the job control module 50 along with data movement functions 64a. These data movement functions 64a can be a part of the data movement module 64 of FIG. 2. Regardless of the hardware platform or operating system on which the various compute tier applications 86 are run, these applications can be interfaced to and controlled through a Java™ virtual machine environment 88 on the computer(s) where they are resident. The implementation and control of such applications using Java™ are well known to those skilled in the art.

Following the client and compute tiers 74, 76 is the web server tier 78 that includes the web server 26 and servlets 54 used to support browser access to the system 10 and its engineering applications and reporting and information resources. Underlying these first three tiers is the application server tier 80 that includes most of the various program modules that together permit automation of many of the aspects involved in the overall engineering project. This includes the system objects 40, job manager 48, workbook 46, workflow 44, virtual review 58, business activities 56, event manager 42, user notifications 52, the data manager 62, and the remainder 64b of the data movement module 64, along with the CDI 66. The lowest level tier is the data tier 82 which in general includes the data 36 that is used to drive the applications—configuration files, html files, XML-based document objects, and work-in-progress (WIP) data files. In particular, this data tier 82 includes CAE data 90, Application Data such as persistent Enterprise JavaBeans (EJBs) and database tables 92, Configuration Data 94, lightweight directory access protocol (LDAP) 96, and web tier support data 98. These data sets will be described further below in greater detail.

The individual functions of the various modules shown in FIGS. 2 and 3 will now be described and it will be understood that the design and interfacing of these modules to each other is well within the level of skill in the art based on the described functionality and architecture included herein. The largest collection of modules is in the application server tier 80. Starting with the system objects module 40, it is used to perform various system services including security and authentication, printing, software license verification, and report distribution. This module receives user input (login name/password) and checks this information against that provided by the LDAP 96 directory for purposes of authentication. This module also provides Security (encryption, etc.). Print commands, program execution requests, and the like are routed to this module for printing and licensing checks.

Event manager 42 is used to provide communication between the various other modules; in particular, it provides event notifications (as well as queuing of these notifications) permitting the different modules to publish or announce events to other modules. This assists in the automated processing capability of the system via the workflow module 44 according to the predefined Standard Work. That is, once a particular task has been completed (e.g., loading analysis on a particular component or assembly), the notification of the completion of this task can then be used to automatically initiate subsequent processing (e.g., stress or fatigue analysis) using the results obtained, and this can be done either with or without user intervention as desired. An example of this will be described further below in connection with FIGS. 5 and 6. The messages can be broadcast to some or all of the modules regardless of which ones would be affected by the message, with the messages being ignored by those that do not need the information. Alternatively, messages can be directed only to the specific modules that need the information, or a combination of this and broadcasting of messages can be used. Where generalized broadcasting of messages is not exclusively used, a subscription service can be provided by the system objects module 40 or event manager 42 so that other modules can subscribe to certain notifications. For example, the workflow module 44 can subscribe to job completion notifications so that it will know whenever a job completes and thus be in a position to initiate subsequent processing. As will be understood by those skilled in the art, the messages from the different modules can be implemented using many different methods of messaging over the communication bus 70 such as: using a pure Java™ Messaging Service (JMS), using a commercial CORBA Notification product, structuring a CORBA type Any OMG Structured Event published using Java™ Messaging Service (JMS), etc.

Workflow module 44 uses Standard Work definitions (stored in the database 94 in a format such as XML-formatted process state documents) for a particular engineering project and provides high-level control of the different processing steps specified by the Standard Work for the project. For this purpose the workflow module 44 receives event notifications, sends out commands to initiate other tasks, and provides high-level control of the transfer of data between the different software tools and processes in order to complete the various process steps. This module also provides a graphical user interface (GUI) display to depict for the user the ordered sequence of work involved in the engineering project. This user interface can also be used to permit the user to control the work (start, stop, suspend), specify runtime parameters, and access the data produced at each step in the process. Although a certain amount of customization may be required for a particular application, many of the functions provided by the workflow module 42 can be obtained using commercially available software, such as, Vitria Technology, Inc.'s BusinessWare™.

Workbook 46 is used in some respects as an engineer's electronic journal and contains the data produced by the various software tools for the engineering project. It can also include user annotations concerning the project and data, as well other user-entered notes and data. Each user can receive his or her own workbook for each project. The engineering project data handled by this module is stored as persisted data in the CAE database 90. To carry out its functions, the workbook module 46 receives notifications from the event manager 42, job documents, process state documents, and workbook definitions from the Application Data database 94, and user input to access and display the data and notes requested by the user. The workbook module can include its own GUI that is used to display the data and user notes and as an interface for receiving user requests as well as notes and other information stored in the workbook. As with the workflow GUI, this interface is preferably displayed to the user via the browser 28. The workbook module can be implemented using custom software or using known software applications such as EASi's Workbook.

The job manager module 48 can be implemented as a distributed module that operates as a gatekeeper to provide access to various hardware and software resources needed to complete the various engineering tasks. It therefore acts as an interface between modules such as workflow 44 and the actual CAE tools 60 used to perform the different engineering functions available in the system. Job manager 48 can either submit jobs to a user specified computing machine or to a particular computing machine that it selects based on job characteristics, machine availability, or machine capability. It can include distributed processing (grid computing) services, if desired. The job manager responds to notifications from the communication bus to control the actual execution of various jobs as commanded by either the workflow 44 or a particular user. It initiates a particular job based on the specification provided by the job document associated with the job. This job document can be specific to a particular type of task and can be accessed automatically each time the task is run, or can be obtained by a reference to the job document from the user's workbook. The job manager 48 can also suspend, restart, resume, and kill various jobs once they have been initiated, and this is preferably done using a unique job identifier that is assigned to each job. The job manager also obtains and provides job status information, again using the job identifier.

The user notifications module 52 provides a GUI "inbox" function that can be accessed via the browser 28. It provides a single location for viewing the various job notices received by the module from such things as the event manager 42 and job manager 48.

The business activities module 56 provides resource planning for the other (non-software) resources implicated by the CAE process. This can include coordinating work by different analysts, human resource planning and allocation, supplier identification and quotation. To carry out its functions, this module uses the Standard Work defined for each project as well as supplementary information such as skill sets for employees, departments, and suppliers. Using the information, it can be used to produce project and resource schedules, reports, and notifications to the event manager. The user can obtain schedules and resource-planning reports via a GUI provided by the module.

The virtual review module 58 is another business tool that allows analysts and others involved in the engineering project to review the project status. This includes the necessary software to generate screen displays and presentations useful for group display via, for example, a projector. It can also provide a reporting function both via hardcopy and by a GUI over the browser 28. The virtual review for a particular project can obtained at any time by a user via a project identifier or by some other identifier associated with the end product for which the engineering project is being carried out, e.g., a vehicle identifier.

The data manager 62 manages data requests, checking data in and out of the databases and controlling the importation and exportation of data. The data is checked out or exported from the CDI system 66 into a working directory and, from there, checked back in or imported in to the databases via CDI 66. The data movement module 64 handles data movement between the working directory and the requesting application. It can include a data adapter for conversions of data between different systems. The data movement module 64 receives specific data movement requests, moves the data to the requested location or application, and generates associated notifications such as "data move completed" or "data move failed." These two modules 62 and 64 can be implemented separately or as part of the CDI system 66, and the CDI 66 is used for overall management of the databases, receiving requests from the data manager 62 and interfacing to the different data sources to store and retrieve data. CDI 66 can be implemented in various ways and using conventional database systems, or can be implemented as described in U.S. Ser. No. 10/243,295, filed Sep. 13, 2002 and entitled "Database Management System Having a Common Database Infrastructure." This prior filed application is assigned to the assignee of the present application and its entire contents are hereby incorporated by reference.

As indicated in FIG. 3, the data tier 82 includes various groups of data including all of the engineering data as well as program and web data needed by the various applications. CAE data 90 includes all accessible data used by engineers, including, for example, product data, performance data, work-in-progress files, and common database data used by the various CAE applications. This can also include common data models used by CDI 66 to represent the data through common data objects. The Application Data 92 includes the content and logic for such things as user notifications 52, event manager 42, data manager 62, and workbook and job documents themselves. The various Configuration Data 94 includes such things as: templates for use in defining Standard Work documents and job documents; and client and server configuration files. LDAP 96 has already been discussed and can be implemented in a conventional manner. Finally, the web tier support data includes such things as the process roadmap files 32, Java™ Server Pages (JSP) templates for dynamically creating web pages, as well as static html pages. The various application tier programs 84 are shown connecting directly to their primary data sources, and it will be appreciated that, although they can be designed to interface directly with these data sources, some or all of the data exchanges between these modules and the data sources can instead by conducted through CDI 66.

Figure 4:
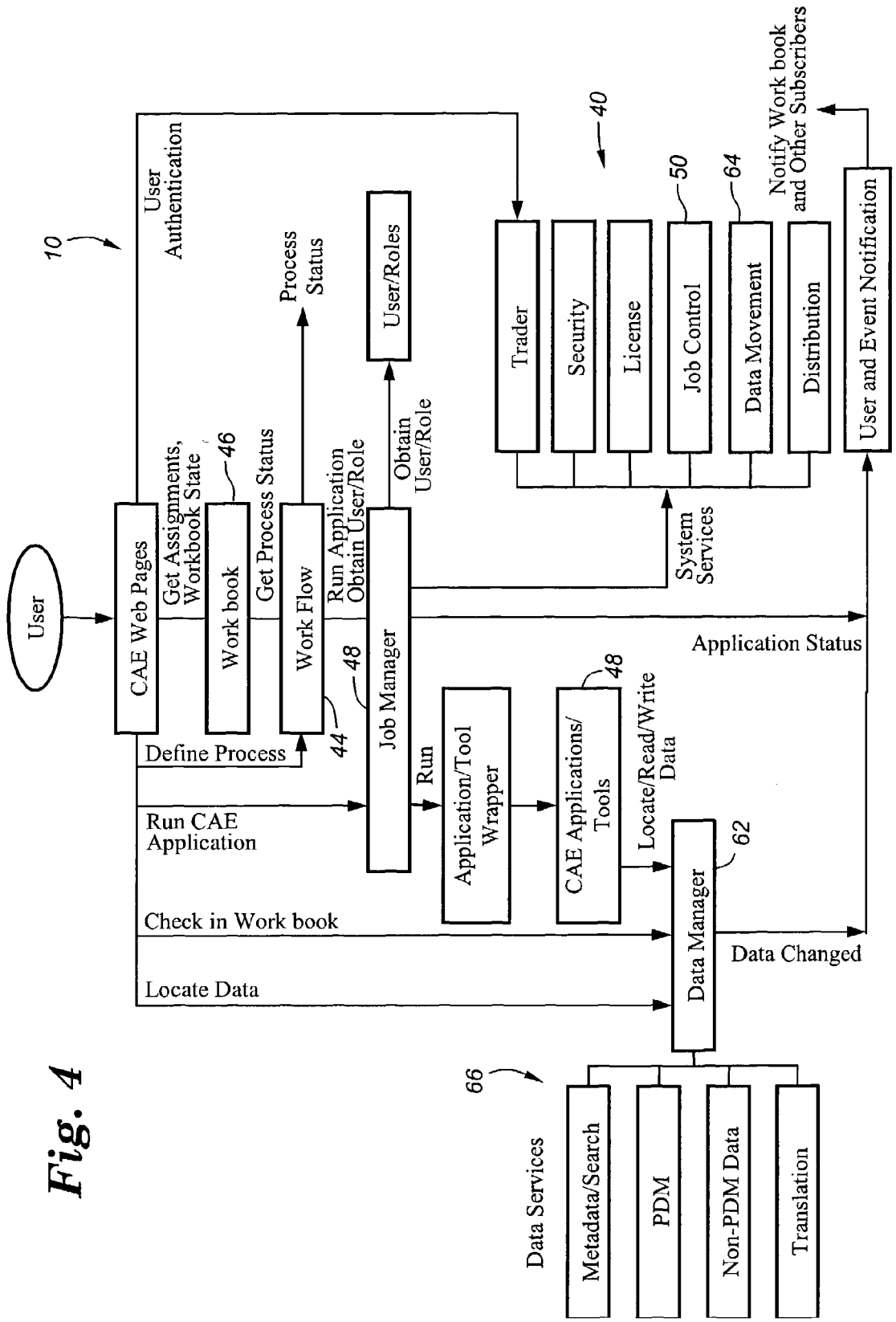
FIG. 4 is a block diagram depicting various components of the software of FIG. 2 and showing the process flows available to a user of the computer system.

Referring now to FIG. 4, there is shown the process flow available to a user 100 using the system 10. Via browser 28, the user 100 is presented with one or more web pages that allow the user to login and thereafter access any of a number of different system functions. This includes locating data, checking out the user's workbook 46 to get assignments and review the workbook contents, checking the workbook back in, running one or more CAE applications, and defining workflow processes. From the work book 46, the user 100 can obtain process status information concerning specific engineering tasks, can run applications, or can obtain user/role information concerning that and other user's roles in the overall project. This is done through the workflow module 44 and, in the case of the latter two tasks, is also handled through the job manager 48. In performing its functions the job manager access the various services it requires, including trader services, security services, license services, report distribution (all of which can be provided by the systems object module 40), as well as job control 50 and data movement 64. Execution of the various CAE applications 86 are also managed by the job manager which runs them via their encapsulating object wrappers. All data accesses are via the data manager 62 which can utilize various services such as meta-data search, translation of data, and access to both Product Data Management (PDM) and non-PDM data. These services can be provided within CDI 66. Status information of various tasks managed by either the job manager 48 or data manager 62 are provided as event notifications to the work book 46 and other subscribing modules, and this status information is also used by user notification module 52 to provide inbox messages to user 100.

Figure 5:
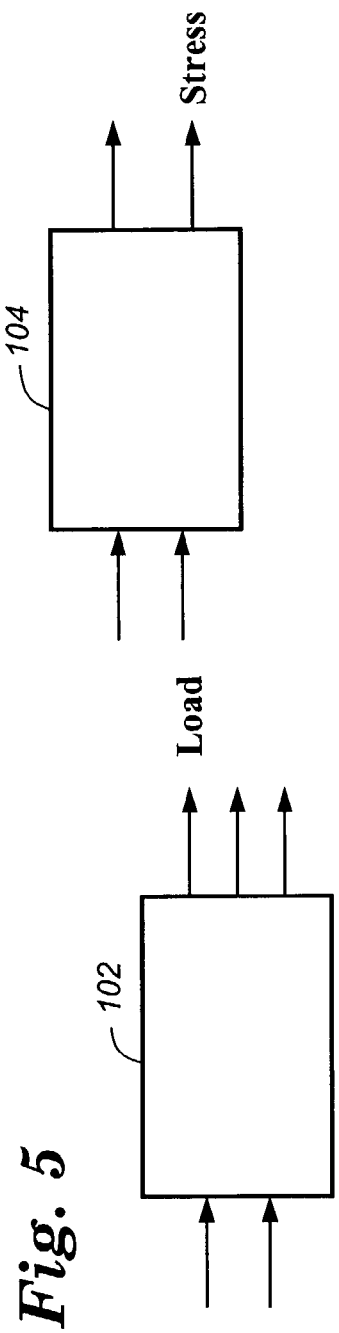
FIG. 5 depicts a portion of a typical engineering project in which engineering analysis tasks are carried out on a piecemeal basis with each task being individually initiated by the analyst.
Figure 6:
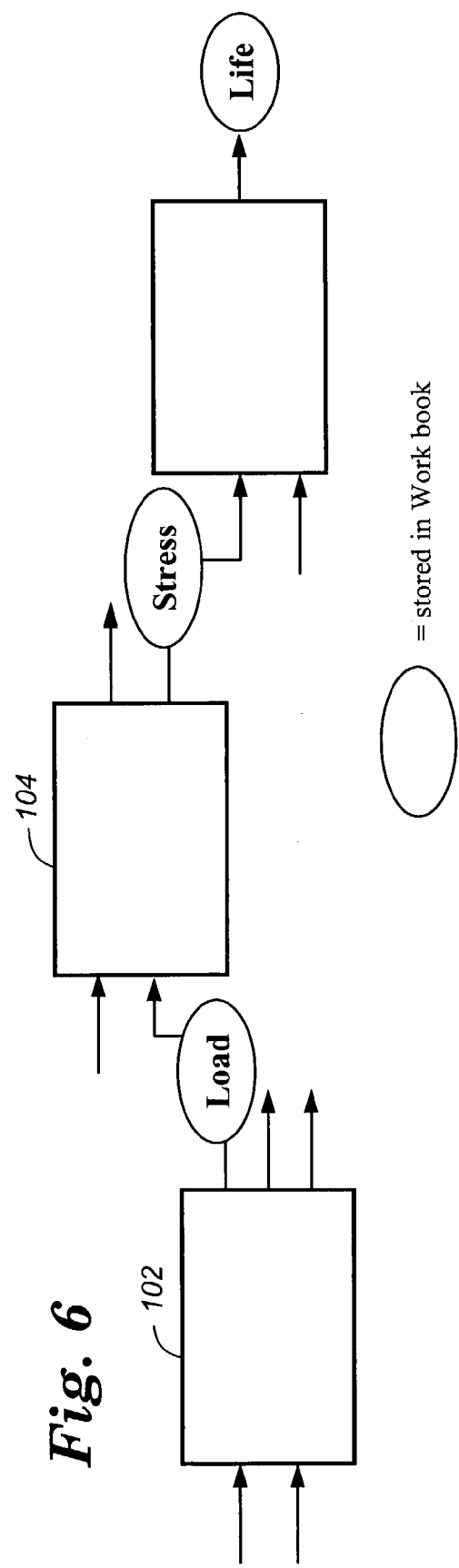
FIG. 6 depicts a similar portion of a typical engineering project in which the workflow features of the software of FIG. 2 are used to automatically carry out a number of sequential engineering tasks.

FIG. 5 depicts a traditional approach to the use of CAE tools in the engineering of automotive systems. A first CAE tool 102 processes input data and generates loading information for a particular component or assembly. A separate CAE application 104 is then used to perform stress analysis using the loading data. These two tasks are carried out on a piecemeal basis with each being individually initiated by the user. Although this process can be implemented using system 10, the workflow features and standardized communication methodology provided by system 10 enable these sequential tasks to be automatically carried out seriatim as each prior task is complete and the data available. This is shown in FIG. 6. The workflow rules are provided by the workflow module 44 (and can be stored along with the other data 36) and the data at each step (load, stress, and product life data in the example shown) is stored in the work book 46, meaning that it is stored in the database 36 but logged into and available to the user via his or her work book.

It will thus be apparent that there has been provided in accordance with the present invention a computerized system for network-based management of engineering projects, which achieves the aims and advantages, specified herein. It will of course be understood that the foregoing description is of preferred exemplary embodiments of the invention and that the invention is not limited to the specific embodiments shown. Various changes and modifications will become apparent to those skilled in the art. For example, the amount of centralized (server side) processing versus client processing can be varied from one system implementation to the next depending upon various deployment, management, and processing considerations that will be known to those skilled in the art. All such variations and modifications are intended to come within the scope of the appended claims.

The invention claimed is:

1. A computer system for carrying out engineering tasks as a part of an engineering project, comprising:

a plurality of client computers;

at least one server computer accessible by the client computers via a communications network; and a multi-tiered software system that includes system programs, application programs, and database programs, each of which is stored on one of the computers, the application programs comprising a plurality of different application programs including one more computer aided software tools used to carry out engineering tasks using data accessed via one or more of the database programs;

wherein the system programs include a system objects module, a job manager module, an event manager module, and a work book module;

wherein the system objects module operates to provide security and authentication services, the application programs operate to carry out at least some of the engineering tasks, the job manager module operates to manage use of the application programs, the event manager module operates to receive and distribute notifications between at least some of the modules, and the work book module operates to provide a user of the application programs with engineering information related to one or more of the engineering tasks; and wherein the job manager module further operates to manage use of the application programs by allocating various job tasks to different application programs based on job characteristics or on the availability or capability of a particular computer to carry out the job task.

2. A computer system as defined in claim 1, wherein the system programs further include a job control module that interfaces to the job manager module and the application programs, and wherein the job control module operates to control execution of individual engineering tasks using the application programs.

3. A computer system as defined in claim 1, wherein the system programs further include a workflow module that operates to provide a display depicting an ordered sequence of engineering tasks involved in the engineering project.

4. A computer system as defined in claim 1, wherein the system programs further include a review module that operates to provide a graphical user interface display of status information concerning the engineering project.

5. A computer system as defined in claim 1, wherein the application programs further include a business activities module that operates to provide resource planning information.

6. A computer system as defined in claim 1, wherein the application programs further include a virtual review module that operates to generate presentations and screen displays of status information concerning the engineering project.

7. A computer system as defined in claim 1, wherein the system programs further include a workflow module that operates to carry out a plurality of engineering tasks by sending notifications to the job manager module using the event manager module.

8. A computer system as defined in claim 1, wherein the programs are accessible as objects having predefined input and output protocols.

9. A computer system as defined in claim 8, wherein at least some of the application programs communicate with one or more of the database programs using XML.

10. A computer system as defined in claim 1, wherein communication between at least some of the programs is carried out using a Java remote method invocation bus.

11. A computer system for carrying out engineering tasks, comprising:

a plurality of client computers;

at least one server accessible by the client computers via a communications network;

a set of client programs stored on one or more of the client computers, the client programs including a system client program, an application client program, and a database client program;

a set of server programs stored on the at least one server, the server programs including a system server program, an application server program, and a database server program, wherein the system server program provides services to the system client program, the application server program provides services to the application client program, and the database server program provides services to the database client program; and a database containing engineering data accessible by the database client program via the database server program;

wherein the client programs are accessible as objects having predefined input and output protocols; and wherein the system client program operates to provide user access to the application client program, and the application client program operates to access the engineering data from the database via communication between the application client program and the database client program using the predefined input and output protocols, and wherein the application client program further operates in response to user input to perform one or more engineering tasks using the accessed engineering data.

12. A computer system as defined in claim 11, wherein the application client program communicates with the database client program using XML.

13. A computer system as defined in claim 11, wherein communication between at least some of the programs is carried out using a Java remote method invocation bus.

14. A computer system as defined in claim 11, further comprising a plurality of application client programs.

15. A computer system as defined in claim 11, further comprising a plurality of system client programs.

* * * * *